A. W. FORBES.
ELECTRIC MOTOR.
APPLICATION FILED JAN. 18, 1913.
1,237,248.
Patented Aug. 14, 1917.
2 SHEETS—SHEET 1.
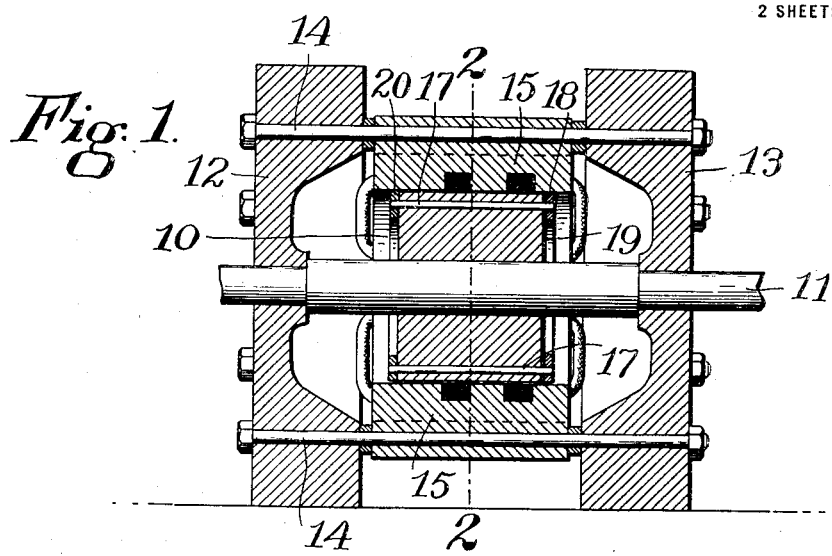
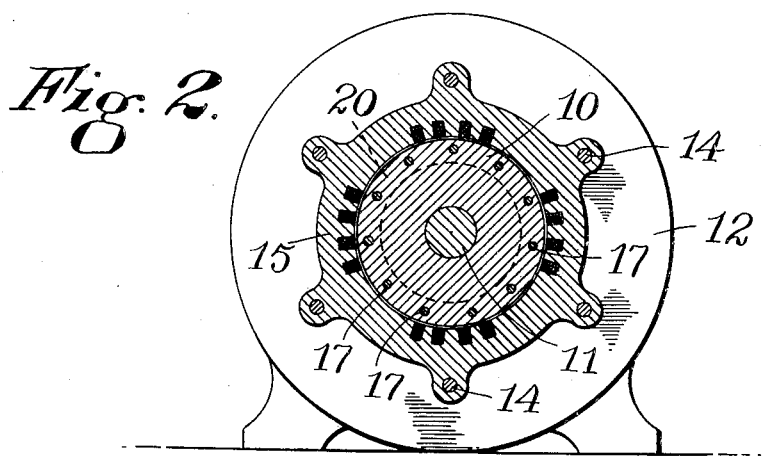
Witnesses.
R. D. Tolman.
H. M. Kennedy.
Inventor
Allan W. Forbes.
By Hartley W. Bartlett
Attorney A. W. FORBES.
ELECTRIC MOTOR.
APPLICATION FILED JAN. 18, 1913.
1,237,248.
Patented Aug. 14, 1917.
2 SHEETS—SHEET 2.
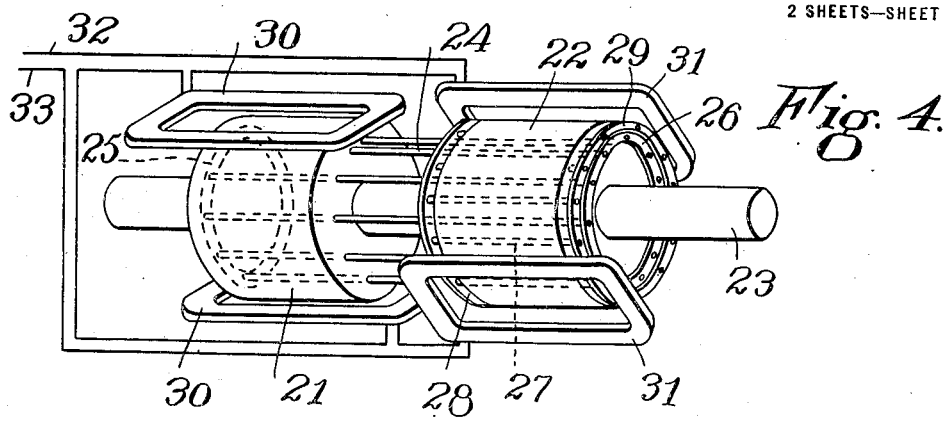
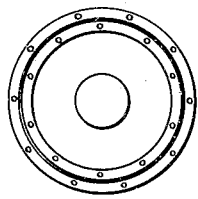
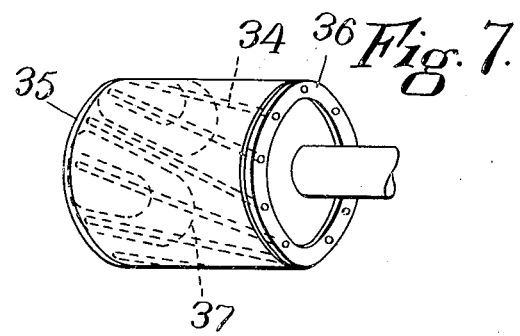
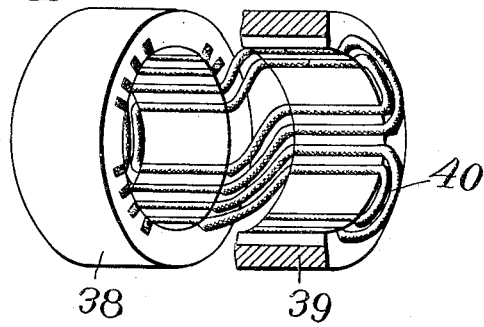
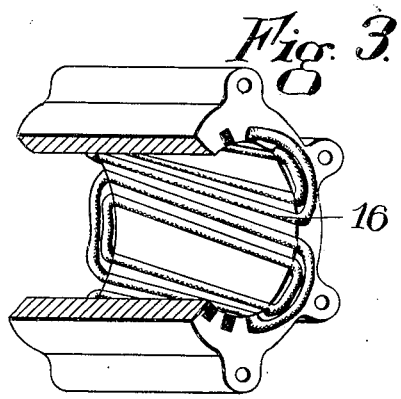
Witnesses
R. D. Tolman.
H. M. Kennedy.
Inventor
Allan W. Forbes.
By Hartley W. Bartlett
Attorney

UNITED STATES PATENT OFFICE.

ALLAN W. FORBES, OF WORCESTER, MASSACHUSETTS.

ELECTRIC MOTOR.

1,237,248.  Specification of Letters Patent.  Patented Aug. 14, 1917.

Application filed January 18, 1913. Serial No. 742,831.

*To all whom it may concern:*

Be it known that I, ALLAN W. FORBES, a citizen of the United States, residing at Worcester, in the county of Worcester, State of Massachusetts, have invented a certain new and useful Improvement in Electric Motors, of which the following is a specification, reference being had therein to the accompanying drawings.

This invention relates to electric motors but more particularly to those of the single phase induction type and means for starting the same.

Heretofore single phase induction motors have generally been started by means of devices which cause the magnetic flux to move around the rotor so as to cross the conductors thereon, producing a flow in these conductors which starts the motor. Of these devices, the most common are the split phase winding of which there are a number of different forms, and the shading pole.

In the present invention the flux is made to move longitudinally of the shaft and the conductors on the rotor and the stator are placed at an angle with each other so that the flux will cut the rotor conductors. This construction produces the same starting effect in the motor but is much simpler in mechanical design and operation and has greater electrical efficiency than either of these earlier types, as will be fully understood from the detailed description following.

Referring to the drawings:—

Figure 1 is a vertical center section of one embodiment of the invention complete.

Fig. 2, section on line 2—2 of Fig. 1.

Fig. 3, detail view, as will be fully described hereinafter.

Fig. 4, diagrammatical view of one embodiment of the invention, as will be fully described hereinafter.

Fig. 5, end view of the rotor shown in Fig. 4.

Figs. 6, and 7, modified forms of the invention, as will be fully described hereinafter.

In the embodiment shown in Figs. 1-3 inclusive, a rotor member 10 is mounted upon the shaft 11 which is supported by suitable bearings in the frames 12 and 13. Between these frames and secured thereto by bolts 14 is the stator 15 which is shown in perspective detailed in Fig. 3, a portion of the wall thereof being cut away to disclose the particular type of winding 16 therein. The rotor in this embodiment is preferably constructed of solid iron though it may be otherwise formed if desired, and through this rotor core passes the insulated conducting rods 17 which form the winding of the same. These rods are here seated in the core parallel to the axis of the shaft on which the rotor is mounted. When this arrangement of the rods 17 is used the winding 16 in the stator should preferably be at an angle as shown in Fig. 3.

The connecting ring 18, preferably of copper or other suitable conducting material, which is in electrical contact with the rods 17 of the core winding, is insulated from the core by the insulation 19. The ring 20 upon the opposite end of the core 10 is in electrical contact with that end of the core instead of insulated therefrom, as was the ring 18 but otherwise is practically the same as this ring.

In order to fully illustrate the principles of the invention, a second embodiment of the invention is diagrammatically illustrated in Fig. 4 of the drawings. In this embodiment two iron structures 21 and 22 are upon the shaft 23 and form the rotor. These structures are similar to simple single phase armatures and are provided with a winding 24, here shown of the squirrel cage type, which extends across between them, the extremities of the rods being secured to or in contact with the connecting rings 25 and 26 on the outer ends of the structures 21 and 22 respectively.

The structure 22 is provided with a second winding 27, also shown of the squirrel cage type, and the rods of this winding terminate in contact with connecting rings 28 and 29 at the opposite ends of this structure.

Two stator windings 30 and 31 respectively opposite the structure 21 and 22 are preferably connected in series and set at an angle to each other about these structures. These windings may be of the concentrated type as shown in Fig. 4, or distributed in several slots as is shown in Fig. 3. The two wires connecting with the line are designated 32 and 33.

When the current enters the motor, it will flow equally in windings 30 and 31. This will induce currents in both rotor windings 24 and 27, in a proportion depending on the resistance and reactance of each of these windings. There will be a greater current under stator winding 31 than under the winding 30 as there are two rotor windings under stator winding 31 and only one under stator winding 30. As this current will flow at about the same time as the voltage, and as the current producing the magnetic flux flows at one fourth of the cycle later than the voltage, the currents in windings 24 and 27 will neutralize the first part of the current wave in stator windings 30 and 31 the latter part of each wave being left to magnetize the iron. Where the current is greater, that is under the winding 31, there will be the greater delay in magnetizing the iron. This means that the flux will go first through 30 then through 31 and then through 30 in the opposite direction. To get from 30 to 31 it must cross the conductors of the winding 24. Then to get to 30 in the opposite direction it must continue to cross the conductors of 24 in the same direction of rotation. We then have a rotating field which is the condition necessary for starting. The fact that it passes from one end of the machine to the other will not interfere.

When the motor is up to speed both windings 24 and 27 will share in doing work. This is a great advantage over previous devices using extra coils on the stator for the latter waste power when running unless mechanically disconnected, which requires objectionable mechanical devices.

In the embodiment of the invention shown in Figs. 1–3 inclusive, the delay in the flux is produced by the contact of the ring 20 with the core while the ring 18 is insulated therefrom. The portion of the rotor adjacent to the ring 20 will act in the same way as does the structure 22 in the embodiment shown in Fig. 4, while the portion of this structure adjacent to the ring 18 will act in the manner described for the structure 21. The setting of the wiring of the stator at an angle as shown in Fig. 3 produces the same effect as was described for the stators 30 and 31 set at an angle to each other in the embodiment of Fig. 4.

Instead of setting the rotor windings parallel to the axis of the shaft and the stator windings at an angle thereto, the rotor windings may be set at an angle as shown in Fig. 7 and the stator windings may be parallel with the shaft or at an opposite angle as desired. In Fig. 7, the winding rods 34 contact on one end of the core with the ring 35 and at the opposite end with the ring 36. This latter end is insulated from the core in the same manner as the ring 18 in the embodiment shown in Fig. 1. The currents produced in the core adjacent to the ring 36 are graphically illustrated by the lines 37, and these currents act in the same manner as the currents in the structure 22 of Fig. 1.

If the two part rotor of the embodiment shown in Fig. 4, is used, the coils of the stator may be united in one by making each turn cross from one iron structure to the other as is shown in the drawings in Fig. 6. The two parts of the stator core are designated 38 and 39 and the windings are designated 40.

The delay in the flux may readily be obtained by using in the rotor core iron of different magnetic qualities.

Many other embodiments of this invention might be illustrated here but it is believed that these will be readily evident to any one skilled in the art in view of the disclosures made in this application, and the applicant does not care to be limited to the particular embodiments herein shown and described.

What I claim as my invention and desire to secure by Letters Patent is:—

1. In an induction motor, the combination with a secondary member comprising a magnetic core, conductors providing paths of relatively high conductivity substantially from end to end thereof, and end rings, one of which is insulated from said core while the other is in electrical contact therewith, of a primary member having means for producing magnetic fields of which the axes at different points in the length of said secondary member have different peripheral displacement relative to said conductors.

2. A secondary member for an induction motor comprising a magnetic core, conductors providing paths of relatively high conductivity substantially from end to end thereof, and end rings, one of which is insulated from said core while the other is in electrical contact therewith.

3. In a device of the class described, a stator, conductors extending substantially from end to end thereof and connected to form a winding therefor, a rotor comprising a core of magnetic material, insulated conductors extending substantially from end to end thereof but set at an angle to the conductors in said stator, a conducting ring at one end of said core in electrical contact with one end of said rotor conductors and with the core, and a second conducting ring at the opposite end of said rotor from the first ring contacting with the opposite end of said conductors from the first ring but insulated from said core.

In testimony whereof I affix my signature in the presence of two witnesses.

ALLAN W. FORBES.

Witnesses:
HARTLEY W. BARTLETT,
HANNAH M. KENNEDY.